(12) United States Patent
Tafoya

(10) Patent No.: US 11,565,470 B1
(45) Date of Patent: Jan. 31, 2023

(54) METHOD OF REMOVING PVA FROM A 3D PRINTING PROCESS

(71) Applicant: David Johathan Tafoya, Maple Grove, MN (US)

(72) Inventor: David Johathan Tafoya, Maple Grove, MN (US)

( * ) Notice: Subject to any disclaimer, the term of this patent is extended or adjusted under 35 U.S.C. 154(b) by 511 days.

(21) Appl. No.: 15/803,080

(22) Filed: Nov. 3, 2017

(51) Int. Cl.
| | |
|---|---|
| B29C 64/35 | (2017.01) |
| B08B 3/08 | (2006.01) |
| B08B 3/14 | (2006.01) |
| B08B 3/10 | (2006.01) |
| B33Y 40/00 | (2020.01) |
| B29C 64/40 | (2017.01) |
| B29K 29/00 | (2006.01) |

(52) U.S. Cl.
CPC ............. B29C 64/35 (2017.08); B08B 3/08 (2013.01); B08B 3/102 (2013.01); B08B 3/14 (2013.01); B33Y 40/00 (2014.12); B08B 2203/007 (2013.01); B08B 2220/04 (2013.01); B29C 64/40 (2017.08); B29K 2029/04 (2013.01)

(58) Field of Classification Search
None
See application file for complete search history.

(56) References Cited

U.S. PATENT DOCUMENTS

| | | | | |
|---|---|---|---|---|
| 3,743,598 | A * | 7/1973 | Field | B01F 3/0861 |
| | | | | 210/709 |
| 4,246,130 | A * | 1/1981 | Koch | C11D 3/43 |
| | | | | 134/38 |
| 5,108,858 | A * | 4/1992 | Patel | H01J 9/2278 |
| | | | | 430/23 |
| 6,506,261 | B1 * | 1/2003 | Man | C11D 1/72 |
| | | | | 134/25.2 |
| 2003/0027738 | A1 * | 2/2003 | Delambre | A01N 43/90 |
| | | | | 510/438 |
| 2017/0253673 | A1 * | 9/2017 | Kent | C07K 17/08 |
| 2017/0327658 | A1 * | 11/2017 | Moreau | B33Y 10/00 |

FOREIGN PATENT DOCUMENTS

| | | | | |
|---|---|---|---|---|
| EP | 0542228 | A1 * | 5/1993 | G03F 7/423 |

OTHER PUBLICATIONS

English Translation of EP-0542228, accessed on Feb. 2020. (Year: 1993).*

* cited by examiner

*Primary Examiner* — Eric W Golightly
*Assistant Examiner* — Arlyn I Rivera-Cordero
(74) *Attorney, Agent, or Firm* — Michael A. Mochinski

(57) ABSTRACT

A method of removing polyvinyl alcohol (PVA)-based scaffold from a 3D printed part formed by a 3D printing process that renders a finished product for immediate use. The method principally involves preparing an acidic-aqueous cleansing solution comprising a mixture of carboxylic acid and water; immersing the 3D printed part conventionally bonded with PVA-based scaffold into the acidic-aqueous cleansing solution for a select amount of time to break down and remove the PVA-based scaffold from the 3D printed part; and adding to the acidic-aqueous cleansing solution a select quantity of polymeric carbohydrate to crosslink and bond with the PVA-based scaffold to effect dissolution thereof into the acidic-aqueous cleansing solution.

19 Claims, 2 Drawing Sheets

METHOD OF REMOVING PVA FROM A 3D PRINTING PROCESS

FIELD OF THE INVENTION

The present invention relates to a method for removing a supportive structure or scaffold connectively associated with a 3D printed part formed by a 3D printing process, wherein the supportive structure or scaffold is fabricated from polyvinyl alcohol (PVA). More specifically, the method permits operation within a non-industrial setting while effecting efficient removal of the PVA-based scaffold from the 3D printed part and rendering it as an inert waste for safe handling and disposal.

DESCRIPTION OF THE PRIOR ART

Manufacturers of parts and components may employ use of various forms of technologies within the scope of the manufacturing process, such as computer numeric control (CNC) milling machines, castings, injection moulds, extrusions, machining, and so forth. Recent advancements in technology have allowed part manufacturers to adopt 3D printing technology that generally fulfills capabilities to prepare and finish onsite or offsite one or a multitude of parts without undue difficulty and within close tolerances, even parts individually possessing a moderate degree of design complexity.

3D printing technology generally incorporates a specialized printer operable by computer control that is particularly capable of expelling an extrusion of polymer-based material, thermoplastic or metal on the basis of multiple layers thereof in two dimensions until attaining a finished 3D printed part. The initial approach to using 3D printing technology is fulfilled by advanced preparation of a computer-aided design (CAD) image file reflective of the proposed part for manufacture, of which is later uploaded onto the specialized 3D printer. Some 3D printers may incorporate within their design multiple extrusion heads or nozzles that advance more control during the part manufacturing process, particularly being advantageous in manufacturing moderately complex, intricate parts.

In instances of manufacturing parts possessing unique design characteristics or intricate sub-components with 3D printing technology, it may be necessary to add supportive structure or scaffold to the part to maintain its stature during the 3D printing process, particularly those that may include features comprising overhangs, voids, undercuts, holes, cavities, etc.

The art generally recognizes three approaches to adding and removing extraneous support or scaffold material from the proposed, finished 3D printed part. In cases where the 3D printer is limited by design with a singular extrusion head or nozzle, for example, the support is typically fabricated with the same material used for the 3D printed part. Although limited, but effective in this regard, the requisite support may be added to the part with the understanding that the 3D printed part will require subsequent processing steps, such as manually removing the support with hand tools and the like. The main disadvantage of fabricating supports in this regard is that you may never attain a finished part that accurately reflects the original design depicted in the CAD image file. Manually cutting, chipping and sanding away support material too much may create small bumps, valleys and/or damage the surface of the 3D printed part, whereby the resultant part may assume a slightly different shape or design and/or require post-processing in the nature of polishing to achieve a good quality surface finish, which undesirably results in an increase in manufacturing costs. In extreme cases of profound, observable defects, rejection of the part is the only viable option.

As a second approach, where in particular the 3D printer by design includes dual extrusion heads or nozzles, for example, one nozzle may be directed for use in fabricating the 3D printed part with a pre-select material, such as ABS thermoplastic, and the other directed to fabricating the support, commonly with polyvinyl alcohol (PVA) that is water soluble. Because PVA-based support is capable of being dissolved when submerged in water, it allows an ample amount of design freedom within the context of the part that may perhaps include voids, overhangs, cavities, intricate, or other complex shapes, with minimal to no adverse structural impact to the 3D printed part while removing the support material. Although effortless in removing PVA-based support from the 3D printed part, which in most cases leaves behind a very smooth surface, PVA can take several hours to dissolve, resulting in delays of manufacturing 3D printed parts. Further, PVA tends to be expensive, more so than other 3D printed part-support approaches, and can degrade if not stored properly.

As a third and final approach, the support may be fabricated with a proprietary material capable of adhering to and supporting the 3D printed part during the manufacturing process while enabling the support to readily breakaway from the 3D printed part with manual tools and the like subsequent to the 3D printing process. Although this support-removal approach leaves little to no surface damage to the 3D printed part, it is not quite as superior to the approach using PVA where the smoothest surface finish can be attained with minimal effort. Like the second approach, the third approach requires utilization of a 3D printer having dual extrusion heads or nozzles individually directed to the material type for the 3D printed part and associated, connecting support. In further respects, breakaway support material requires accessibility for removal, which may not always be the case with certain 3D printed parts of moderate design complexity.

Accordingly, there remains a need for a method that efficiently removes PVA-based scaffold or support from the 3D printed part formed by the 3D printing process within an amount of time that surpasses the timeframes recognized in the art, while fulfilling capabilities to operate within a non-industrial setting and renders the waste PVA-based scaffold relatively inert for safe handling and disposal.

SUMMARY OF THE INVENTION

The general purpose of the present invention, which will be described subsequently in greater detail, is to provide a new method of removing PVA-based scaffold from a 3D printed part formed by a 3D printing process that is not anticipated, rendered obvious, suggested, or even implied by any of the methods known and recognized in the art, either alone or in any combination thereof.

The method of the present invention principally includes the steps of preparing an acidic-aqueous cleansing solution comprising a mixture of water and an acid having physical properties and chemical characteristics substantially equivalent to carboxylic acid; immersing at least one 3D printed part conventionally bonded with scaffold fabricated from polyvinyl alcohol (PVA) into the acidic-aqueous cleansing solution for a select amount of time to break down and remove the PVA-based scaffold from the 3D printed part; adding to the acidic-aqueous cleansing solution a sufficient amount of polymeric carbohydrate to crosslink and bond with the PVA-based scaffold to advance its isolation from the 3D printed part; and further adding to the acidic-aqueous cleansing solution a polyol surfactant of sufficient quantity to accelerate the release of the PVA-based scaffold from and inhibit re-bonding with the 3D printed part. None of the prior art includes the combination of the elements of the present invention.

There has thus been outlined, rather broadly, the more important features of the method of removing PVA-based scaffold from a 3D printed part formed by a 3D printing process in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood, that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new method of removing PVA-based scaffold from a 3D printed part formed by a 3D printing process that effectively reduces the timeframe by which PVA-based scaffold separates from the 3D printed part and dissolves in solution such to make available a finished product for immediate use.

Still another object of the present invention is to provide a new method of removing PVA-based scaffold from a 3D printed part formed by a 3D printing process that renders the PVA-based scaffold nonhazardous and biodegradable for safe handling and disposal.

Even still another object of the present invention is to provide a new method of removing PVA-based scaffold from a 3D printed part formed by a 3D printing process that crosslinks a carbohydrate substance with the PVA-based scaffold to either form a solid waste product or a flowable waste product.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawing and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
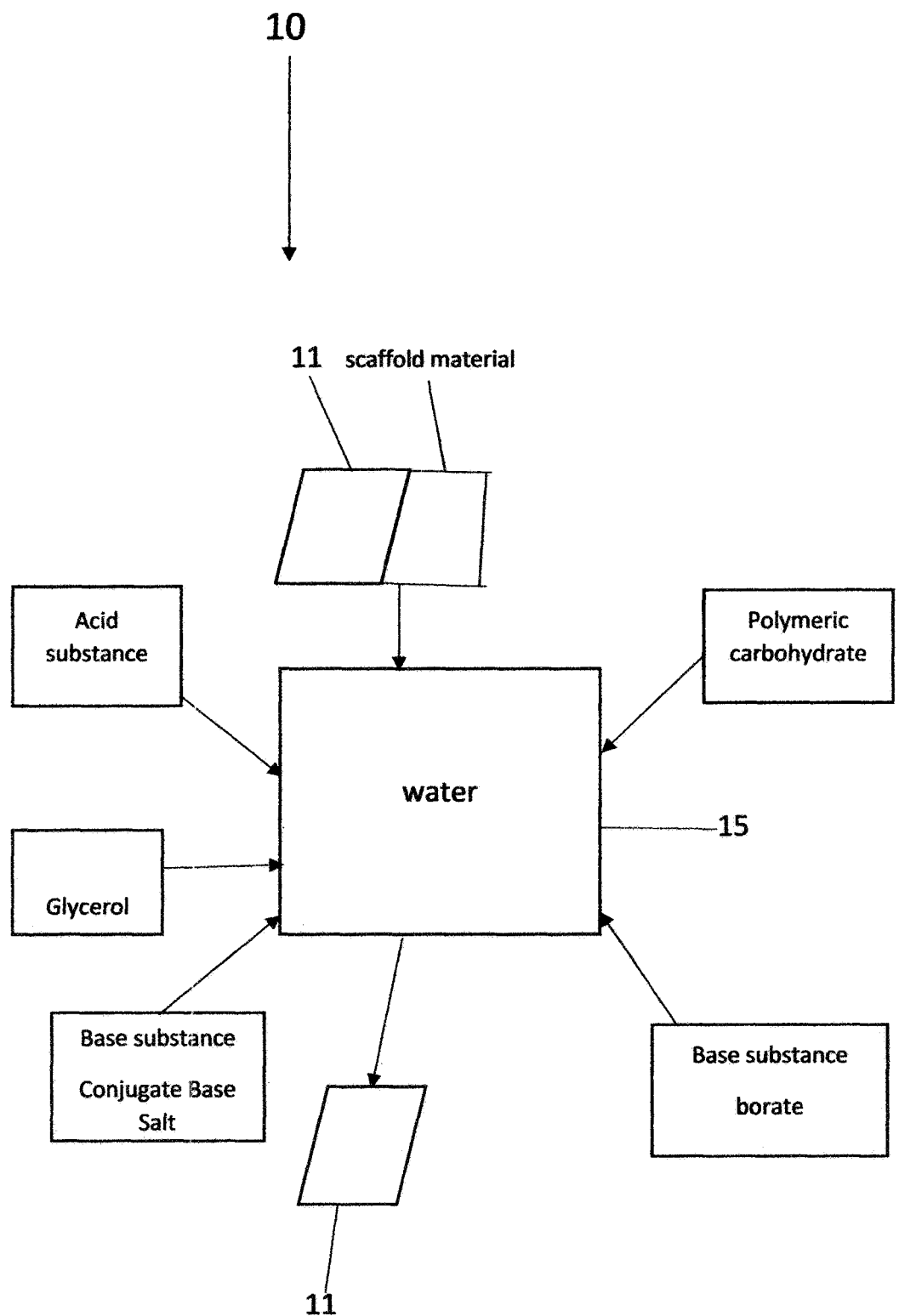
FIG. 1 is block diagram of a new method of removing PVA-based scaffold from a 3D printed part formed by a 3D printing process according to the present invention.
Figure 2:
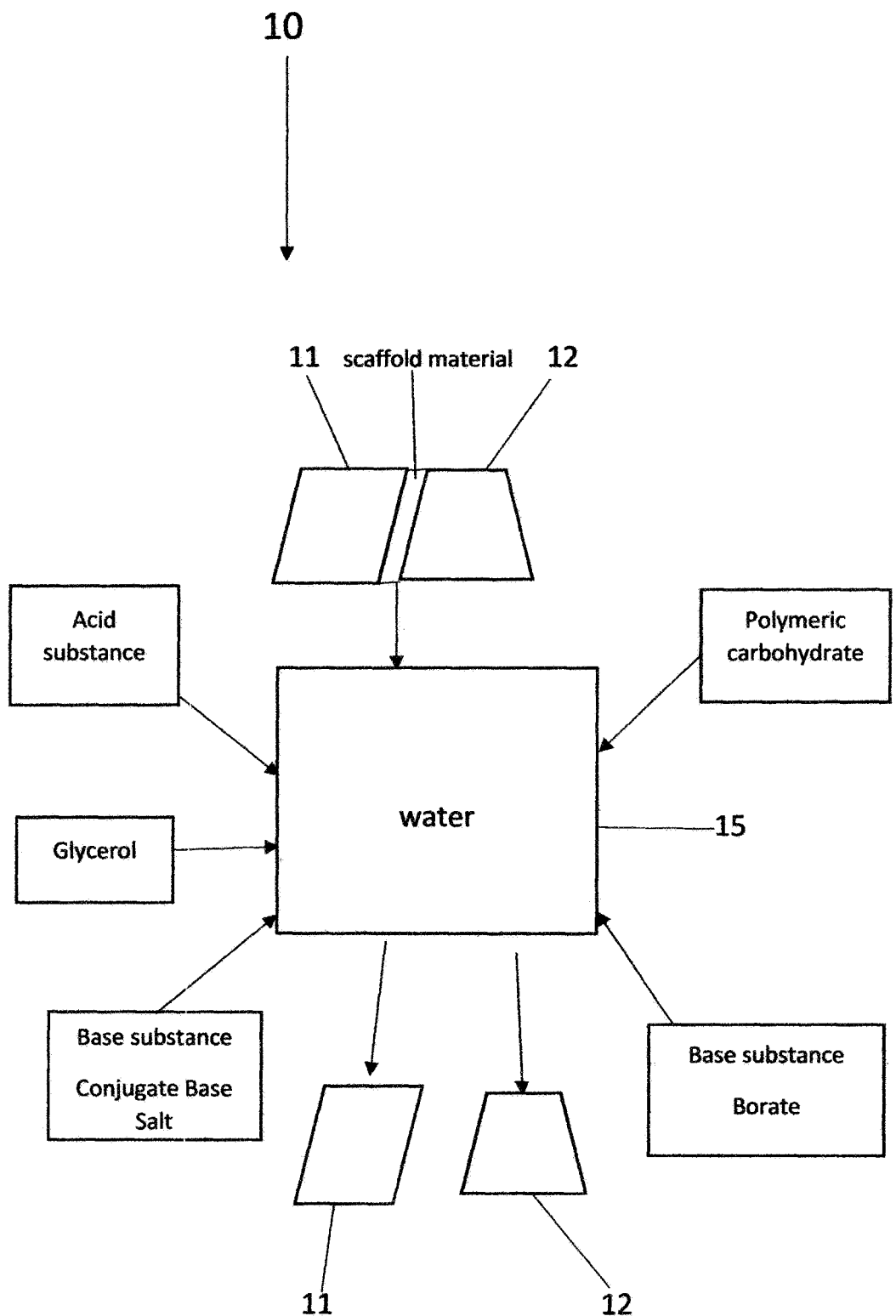
FIG. 2 is block diagram of a second embodiment of the new method of removing PVA-based scaffold from a 3D printed part formed by a 3D printing process.

With reference now to the drawings, and in particular to FIGS. 1 and 2 thereof, a new method of removing polyvinyl alcohol (PVA)-based scaffold from a 3D printed part formed by a 3D printing process embodying the principles and concepts of the present invention and generally designated by the reference numeral 10 will be described hereinafter in further detail.

As best illustrated in FIGS. 1 and 2, the method of removing PVA-based scaffold from the 3D printed part formed by the 3D printing process 10 generally comprises the steps of preparing an acidic-aqueous cleansing solution comprising a mixture of a select amount acid and water; immersing at least one 3D printed part 11,12 conventionally bonded with PVA-based scaffold into a conventional container 15 containing the acidic-aqueous cleansing solution for a select amount of time to break down and remove the PVA-based scaffold from the 3D printed part 11,12; and adding to the acidic-aqueous cleansing solution a select substance to crosslink and bond with the PVA-based scaffold to effect dissolution thereof into the acidic-aqueous cleansing solution. The acid is of sufficient quantity in the acidic-aqueous cleansing solution to attain a pH of between 1.0 and 6.9. The acid in this regard facilitates the breakdown and complete removal of the PVA-based scaffold from the 3D printed part 11,12. The speed of the dissolution of the PVA-based scaffold is in direct correlation with the quantity of acid used, temperature of the cleansing solution and agitation of the cleansing solution. Adding quantities of acid, raising the temperature and applying agitation to the acidic-aqueous cleansing solution increases the speed of dissolution of the PVA-based scaffold in the cleansing solution. An acid such as carboxylic acid is known to react with water to form hydronium ions, which subsequently degrades and dissolves the PVA-based scaffold in solution. Acidic conditions also promote a radical chain scission at high temperatures. Low pH water generates more radicals for this process than neutral pH water does.

The select substance is a polymeric carbohydrate in a quantity equivalent to 0.1 to 20 times an amount of the PVA-based scaffold immersed in the acidic-aqueous cleansing solution. The polymeric carbohydrate is selected from a group comprising starch, glycogen, chitin, and cellulose and any synthetic derivatives thereof.

As another embodiment, polyol surfactant in any quantity is added as an emulsifier to the acidic-aqueous cleansing solution for facilitating by up to 40% faster the removal and breakdown of the PVA-based scaffold from the 3D printed part 11,12.

A base substance is added to the acidic-aqueous cleansing solution to neutralize and effect nonhazardous waste products for easy disposal. The base substance is of a quantity which raises the pH of the acidic-aqueous cleansing solution to between 5.5 and 9.0. The base substance comprises a conjugate base salt of a quantity which completely dissolves in the acidic-aqueous cleansing solution and raises the pH of the acidic-aqueous cleansing solution to render a flowable solution that is environmentally safe for disposal. As another embodiment, the base substance comprises borate of a quantity which crosslinks and bonds with the dissolved PVA-based scaffold and forms a solid waste in the acidic-aqueous cleansing solution that can be separated from the acidic-aqueous cleansing solution and rendered environmentally safe for disposal.

As to a further discussion of the manner of usage and operation of the present invention, the same should be apparent from the above description. Accordingly, no further discussion relating to the manner of usage and operation will be provided. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the method of removing PVA-based scaffold from the 3D printed part formed by the 3D printing process. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of removing PVA-based scaffold connectively associated with a 3D printed part, the method comprising the steps of:
    preparing an acidic-aqueous cleansing solution comprising carboxylic acid added to water of sufficient quantity to attain a pH of at least 6.9 or lower;
    adding to said acidic-aqueous cleansing solution a polymeric carbohydrate in a quantity of 0.1 to 20 times the amount of PVA-based scaffold by weight such to crosslink and bond with the PVA-based scaffold to advance its isolation from the 3D printed part;
    adding to said acidic aqueous-cleansing solution a polyol surfactant of sufficient quantity to accelerate the release of the PVA-based scaffold from and inhibit re-bonding with the 3D printed part; and
    immersing within said acidic-aqueous cleansing solution the PVA-based scaffold connectively associated with the 3D printed part for a sufficient amount of time that renders the PVA-based scaffold observably released from the 3D printed part and substantially dissolved within said acidic-aqueous cleansing solution.

2. The method as set forth in claim 1, further comprising the step of agitating and increasing the temperature of said acidic-aqueous cleaning solution to intensify the speed by which the PVA-based scaffold dissolves in solution and releases from the 3D printed part.

3. The method as set forth in claim 1, wherein said polymeric carbohydrate is selected from a group comprising starch, glycogen, chitin, cellulose, and any synthetic derivatives thereof.

4. The method as set forth in claim 1, further comprising the step of adding to said acidic-aqueous cleansing solution a conjugate base salt of sufficient quantity to dissolve in solution with that of said acidic-aqueous cleansing solution and elevate the pH thereof to substantially attain neutrality and render a flowable solution for safe disposal.

5. The method as set forth in claim 1, further comprising the step of adding to said acidic-aqueous cleansing solution a borate of sufficient quantity to elevate the pH thereof to substantially attain neutrality and crosslink and bond with dissolved PVA-based scaffold to observably effect solidification thereof for safe disposal.

6. A method of removing PVA-based scaffold connectively associated with a 3D printed part, the method comprising the steps of:
    preparing an acidic-aqueous cleansing solution comprising carboxylic acid added to water of sufficient quantity to attain a pH of at least 6.9 or lower;
    adding to said acidic-aqueous cleansing solution a polymeric carbohydrate in a quantity of 0.1 to 20 times the amount of PVA-based scaffold by weight such to crosslink and bond with the PVA-based scaffold to advance its isolation from the 3D printed part; and
    immersing within said acidic aqueous cleansing solution the PVA-based scaffold connectively associated with the 3D printed part for a sufficient amount of time that renders the PVA-based scaffold observably released from the 3D printed part and substantially dissolved within said acidic-aqueous cleaning solution.

7. The method as set forth in claim 6, further comprising the step of adding to said acidic-aqueous cleansing solution a polyol surfactant of sufficient quantity to accelerate the release of the PVA-based scaffold from the 3D printed part and inhibit its re-bonding with the 3D printed part.

8. The method as set forth in claim 7, further comprising the step of agitating and increasing the temperature of said acidic-aqueous cleaning solution to intensify the speed by which the PVA-based scaffold dissolves in solution and releases from the 3D printed part.

9. The method as set forth in claim 7, wherein said polymeric carbohydrate is selected from a group comprising starch, glycogen, chitin, cellulose, and any synthetic derivatives thereof.

10. The method as set forth in claim 9, further comprising the step of adding to said acidic-aqueous cleansing solution a conjugate base salt of sufficient quantity to dissolve in solution with that of said acidic-aqueous cleansing solution and elevate the pH thereof to substantially attain neutrality and advance a flowable solution for safe disposal.

11. The method as set forth in claim 9, further comprising the step of adding to said acidic-aqueous cleansing solution a borate of sufficient quantity to elevate the pH thereof to substantially attain neutrality and crosslink and bond with dissolved PVA-based scaffold to observably effect solidification thereof for safe disposal.

12. A method of removing PVA-based scaffold connectively associated with a 3D printed part, the method comprising the steps of:
    preparing an acidic-aqueous cleansing solution comprising a mixture of a select amount acid and water, said acid having physical properties and chemical characteristics substantially equivalent to carboxylic acid;
    adding to said acidic-aqueous cleansing solution a sufficient amount of polymeric carbohydrate to crosslink and bond with the PVA-based scaffold to advance its isolation from the 3D printed part; and
    immersing within said acidic-aqueous cleansing solution the PVA-based scaffold connectively associated with the 3D printed part for a sufficient amount of time that renders the PVA-based scaffold observably released from the 3D printed part and substantially dissolved within said acidic-aqueous cleansing solution.

13. The method as set forth in claim 12, wherein said acid is carboxylic acid and said polymeric carbohydrate is selected from a group comprising starch, glycogen, chitin, cellulose, and any synthetic derivatives thereof.

14. The method as set forth in claim 12, further comprising the step of agitating said acidic-aqueous cleaning solution in a sustained manner to intensify the speed by which the PVA-based scaffold dissolves in solution and releases from the 3D printed part.

15. The method as set forth in claim 14, further comprising the step of increasing the temperature of said acidic-aqueous cleaning solution to intensify the speed by which the PVA-based scaffold dissolves in solution and releases from the 3D printed part.

16. The method as set forth in claim 12, further comprising the step of adding to said acidic-aqueous cleansing solution a polyol surfactant of sufficient quantity to accelerate the release of the PVA-based scaffold from and inhibit re-bonding with the 3D printed part.

17. The method as set forth in claim 16, further comprising the step of adding to said acidic-aqueous cleansing solution a base substance of sufficient quantity to effect neutralization and characterization thereof as non-hazardous for safe handling and disposal.

18. The method as set forth in claim 17, wherein said base substance is a borate added to said acidic-aqueous cleansing solution of sufficient quantity to elevate the pH thereof to substantially attain neutrality and crosslink and bond with dissolved PVA-based scaffold to observably effect solidification thereof for safe disposal.

19. The method as set forth in claim 17, wherein said base substance is a conjugate base salt added to said acidic-aqueous cleansing solution of sufficient quantity to dissolve in solution with that of said acidic-aqueous cleansing solution and elevate the pH thereof to substantially attain neutrality and render a flowable solution for safe disposal.

\* \* \* \* \*